(12) United States Patent
Kim et al.

(10) Patent No.: US 9,464,836 B2
(45) Date of Patent: Oct. 11, 2016

(54) AIR CONDITIONER AND STARTING CONTROL METHOD THEREOF

(71) Applicant: SAMSUNG ELECTRONICS CO., LTD., Suwon (KR)

(72) Inventors: Kyoung Rock Kim, Suwon (KR); Jong Moon Kim, Hwaseong (KR); Hyeong Joon Seo, Suwon (KR); Byoung Guk Lim, Suwon (KR); Chawang Jang, Suwon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 543 days.

(21) Appl. No.: 13/739,582

(22) Filed: Jan. 11, 2013

(65) Prior Publication Data

US 2013/0186111 A1    Jul. 25, 2013

(30) Foreign Application Priority Data

Jan. 19, 2012 (KR) .................... 10-2012-0006291

(51) Int. Cl.
| F25B 49/00 | (2006.01) |
| F25B 7/00 | (2006.01) |
| F25D 17/00 | (2006.01) |
| F25D 3/02 | (2006.01) |
| F25B 1/10 | (2006.01) |
| F25B 49/02 | (2006.01) |
| F25B 13/00 | (2006.01) |

(52) U.S. Cl.
CPC .............. *F25B 49/022* (2013.01); *F25B 13/00* (2013.01); *F25B 2313/02741* (2013.01); *F25B 2400/0751* (2013.01); *F25B 2500/26* (2013.01); *F25B 2600/0253* (2013.01); *F25B 2600/0261* (2013.01); *F25B 2700/1931* (2013.01); *F25B 2700/1933* (2013.01); *F25B 2700/2104* (2013.01); *F25B 2700/2106* (2013.01); *Y02B 30/741* (2013.01)

(58) Field of Classification Search
CPC ..................... F25B 49/022; F25B 2400/0571; F25B 2400/075; F25B 2500/26
USPC .......................... 62/175, 182, 228.1, 318, 510
See application file for complete search history.

(56) References Cited

U.S. PATENT DOCUMENTS

| 4,502,842 A * | 3/1985 | Currier et al. ..................... 417/8 |
| 5,095,715 A * | 3/1992 | Dudley ......................... 62/228.4 |

(Continued)

FOREIGN PATENT DOCUMENTS

EP    0 410 570 A2    6/1990

OTHER PUBLICATIONS

Extended European Search Report issued Oct. 16, 2013 in corresponding European Application No. 13 15 1652.

*Primary Examiner* — M. Alexandra Elve
*Assistant Examiner* — Paul Alvare
(74) *Attorney, Agent, or Firm* — Staas & Halsey LLP

(57) ABSTRACT

An air conditioner having a plurality of compressors and a starting control method thereof, where the plurality of compressors is simultaneously started if a starting load of the air conditioner is smaller than a reference load, and the plurality of compressors is sequentially started if the starting load of the air conditioner is larger than the reference load, thereby simultaneously starting the plurality of compressors at a starting load section in which a starting stability of the compressors is secured, and thus capable of enhancing the cooling and heating performance.

4 Claims, 16 Drawing Sheets

(56) References Cited

U.S. PATENT DOCUMENTS

| | | | |
|---|---|---|---|
| 6,519,957 B2* | 2/2003 | Huh et al. | 62/175 |
| 6,669,102 B1 | 12/2003 | Lee | |
| 6,807,817 B2* | 10/2004 | Lee et al. | 62/175 |
| 7,621,138 B2* | 11/2009 | Lee et al. | F25B 49/005 236/1 B |
| 7,793,509 B2* | 9/2010 | Crane | 62/175 |
| 2003/0230097 A1* | 12/2003 | Moon et al. | 62/175 |
| 2003/0233837 A1* | 12/2003 | Lee et al. | 62/175 |
| 2005/0240312 A1* | 10/2005 | Terry et al. | 700/276 |

* cited by examiner

← COOLING OPERATION
←--- HEATING DRIVING

AIR CONDITIONER AND STARTING CONTROL METHOD THEREOF

CROSS-REFERENCE TO RELATED APPLICATIONS

This application claims the benefit of Korean Patent Application No. 2012-0006291, filed on Jan. 19, 2012, in the Korean Intellectual Property Office, the disclosure of which is incorporated herein by reference.

BACKGROUND

1. Field

Embodiments of the present disclosure relate to an air conditioner and a starting control method thereof, and more particularly, to an air conditioner having a plurality of compressors and a starting control method thereof.

2. Description of the Related Art

As an example of an air conditioner, a heat pump-type air conditioner is an apparatus configured to change a circulation direction of refrigerant in a refrigerant cycle, so that a heating in a winter season along with a cooling in a summer season may be performed.

The heat pump-type air conditioner is provided in a way that, during a cooling operation, a condensation of refrigerant occurs at an outdoor heat exchanger by adjusting a 4-way valve, so that the refrigerant being discharged from a compressor may be drawn into the outdoor heat exchanger, and the condensed refrigerant is decompressed at an expansion valve of an indoor side, and then is evaporated at an indoor heat exchanger to take the heat from the indoor air, so that a cooling may be performed. The refrigerant that is passed through the indoor heat exchanger passes through the 4-way valve, and is drawn into the compressor to be compressed.

During a heating operation, in order for the refrigerant being discharged from the compressor to be withdrawn into the indoor heat exchanger, the 4-way valve is adjusted, so that condensation of the refrigerant may occur at the indoor heat exchanger to supply heat to the indoor air, and thus a heating action is being performed. The refrigerant that is passed through the indoor heat exchanger is decompressed at the expansion valve of an outdoor side, and then is drawn into the compressor again by passing through the outdoor heat exchanger and the 4-way valve.

The heat pump-type air conditioner as such includes two units of compressors each having a different operating capacity to enhance the energy efficiency.

For example, the compressors are designed to be driven in a ratio of a cooling ability of about 6:4. In a case of a first stage driving in which a first compressor having a low operating capacity is being driven, the cooling ability of about 30% to 50% is provided, and in a case of a second stage driving in which a second compressor having a high operating capacity is being driven, the cooling ability of about 50% to 70% is provided. In addition, in a case of a third stage driving in which both the first compressor and the second compressor are being driven, the cooling ability of about 100% is provided.

In general, the first compressor having a low operating capacity is implemented with a variable-capacity compressor capable of varying the operating capacity, and the second compressor having a high operating capacity is implemented with a constant-speed compressor.

Conventionally, in a case of the third stage driving that operates the both of the two units of compressors, the first compressor is started first, and then the second compressor is started for a purpose of decreasing a starting load at the time of an initial start of an air conditioner. As a reference, the starting load of a compressor is increased in a case of the compressor is started when refrigerant is excessively mixed in oil, when a degree of a pressure imbalance occurred between a high pressure side and a low pressure side is severe, when lubricant is not sufficiently supplied to the compressor, or when an input of power has not taken place for a long period of time.

When the second compressor is started, in order to decrease the starting load of the second compressor, which is started after the first compressor, the operating capacity of the first compressor that is already started and driven is decreased.

In the process of decreasing the capacity of the first compressor, which is started and driven prior to the second compressor, to decrease the starting load of the second compressor and of starting the second compressor and simultaneously increasing the operating capacities of the first and the second compressors, the cooling and heating ability of an overall system shows a pattern decreasing and then increasing. Eventually, from the perspective of a user, the cooling and heating speed is decreased.

To prevent the decrease of the cooling and heating speed as such, in a case of simultaneously starting the two units of the compressors, the starting load is increased, and thus the possibility of the starting the compressors failing is increased.

SUMMARY

Therefore, it is an aspect of the present disclosure to provide an air conditioner capable of simultaneously starting a plurality of compressors when the driving of the plurality of the compressors is needed, while a starting stability of the compressors are secured, and a starting control method thereof.

Additional aspects of the disclosure will be set forth in part in the description which follows and, in part, will be apparent from the description, or may be learned by practice of the disclosure.

In accordance with one aspect of the present disclosure, an air conditioner includes a plurality of compressors, a determining unit and a control unit. The determining unit may be configured to determine whether a starting load of the air conditioner is smaller than a reference load. The control unit, in a case when an operating of the plurality of compressors is needed, may be configured to simultaneously start the plurality of compressors if the starting load of the air conditioner is smaller than the reference load as a result of the determination of the determining unit, and configured to sequentially start the plurality of compressors if the starting load of the air conditioner is larger than the reference load.

In accordance with another aspect of the present disclosure, a starting control method of an air conditioner having a plurality of compressors is as follows. Whether a starting load of the air conditioner is smaller than a reference load may be determined in a case when an operating of the plurality of compressors is needed. The plurality of compressors may be started in a simultaneous manner when the starting load of the air conditioner is smaller than the reference load, and the plurality of compressors may be started in a sequential manner when the starting load of the air conditioner is larger than the reference load.

As described above, when the driving of a plurality of compressors is needed, the plurality of compressors are simultaneously started when a starting load of an air conditioner is smaller than a reference load, and the plurality of compressors is sequentially started when the starting load of the air conditioner is larger than the reference load, and thus the plurality of compressors may be simultaneously started at a starting load section in which a starting stability of the compressors is secured, and the cooling and heating performance may be enhanced.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
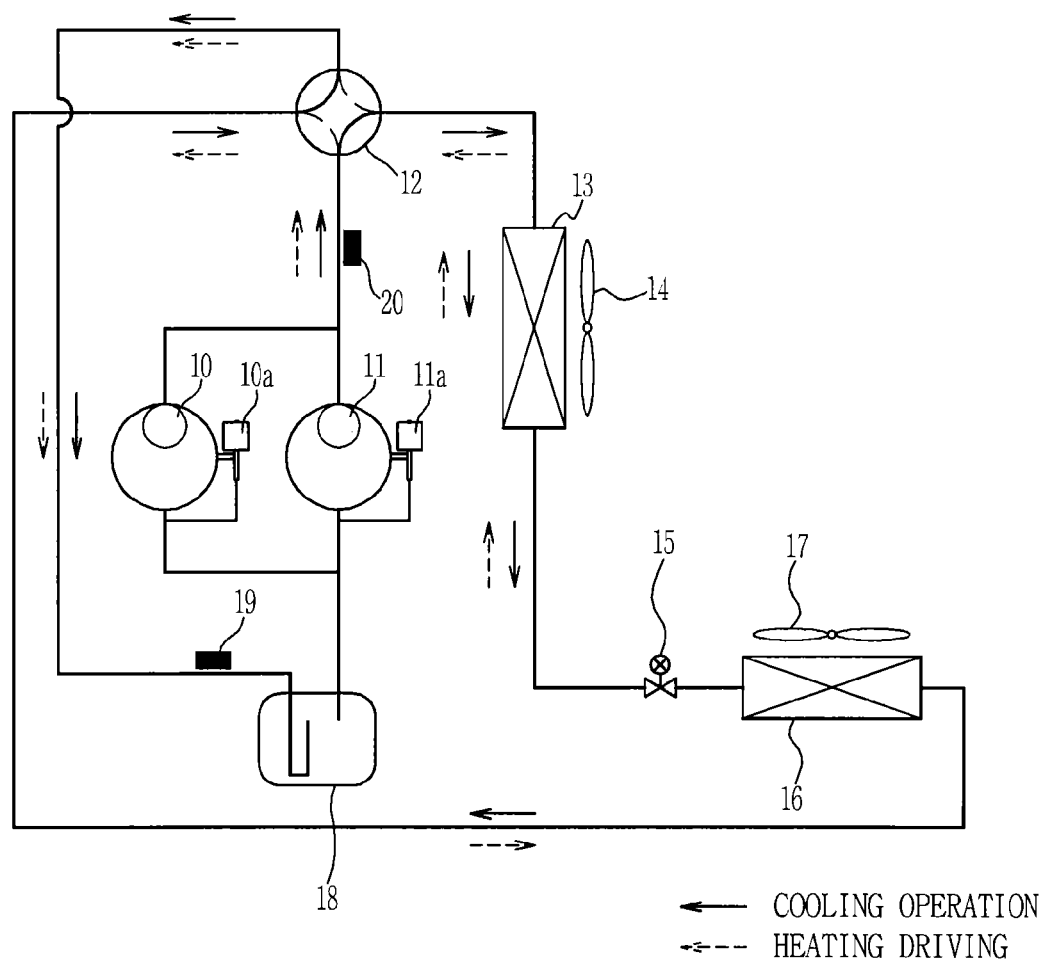
FIG. 1 is a refrigerant cycle of an air conditioner in accordance with one embodiment of the present disclosure.

Reference will now be made in detail to the embodiments of the present disclosure, examples of which are illustrated in the accompanying drawings, wherein like reference numerals refer to like elements throughout.

FIG. 1 is a refrigerant cycle of an air conditioner in accordance with one embodiment of the present disclosure.

As illustrated on FIG. 1, the air conditioner includes a plurality of compressors 10 and 11, a 4-way valve 12, an outdoor heat exchanger 13, an outdoor fan 14, an electric expansion valve 15, an indoor heat exchanger 16, an indoor fan 17 and an accumulator 18.

The plurality of compressors 10 and 11 each may be constant-speed compressors, or a combination of a constant-speed compressor and a variable-capacity compressor capable of varying the capacity thereof.

The plurality of compressors 10 and 11 each may be variable-capacity compressor. The variable-capacity compressor may be employed with a revolution count variable method and a Pulse Width Modulation (PWM) method.

With respect to the variable-capacity compressor employed with the PWM method, the capacity of the compressor becomes variable according to a duty control signal that determines the loading time during which refrigerant is compressed, and the unloading time during which the compression of the refrigerant is stopped.

Hereinafter, the operation of the compressor applied to the air conditioner in accordance with one embodiment of the present disclosure will be described.

Figure 2:
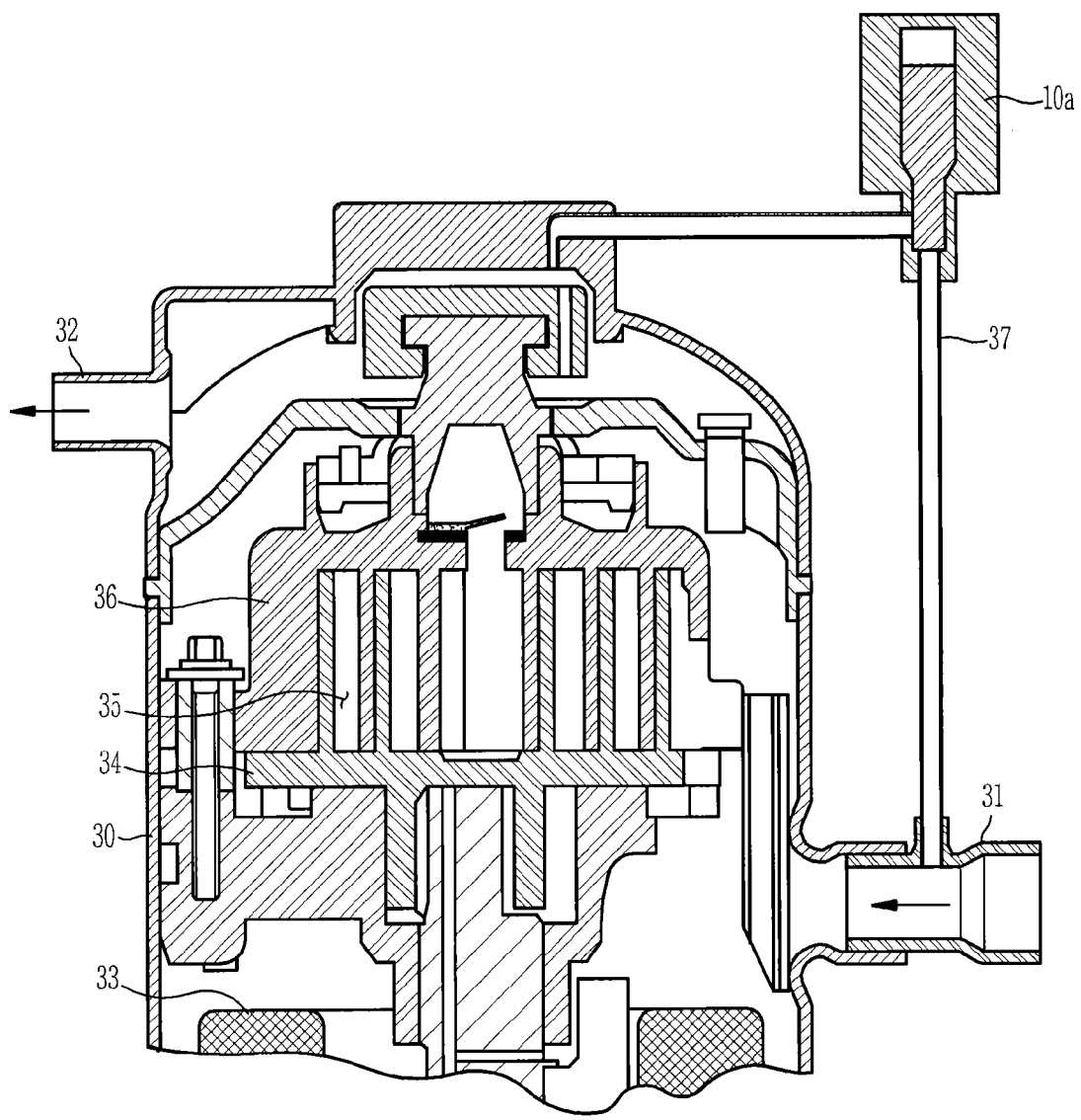
FIG. 2 is a cross-sectional view illustrating a loading state of a compressor at the air conditioner in accordance with one embodiment of the present disclosure.
Figure 3:
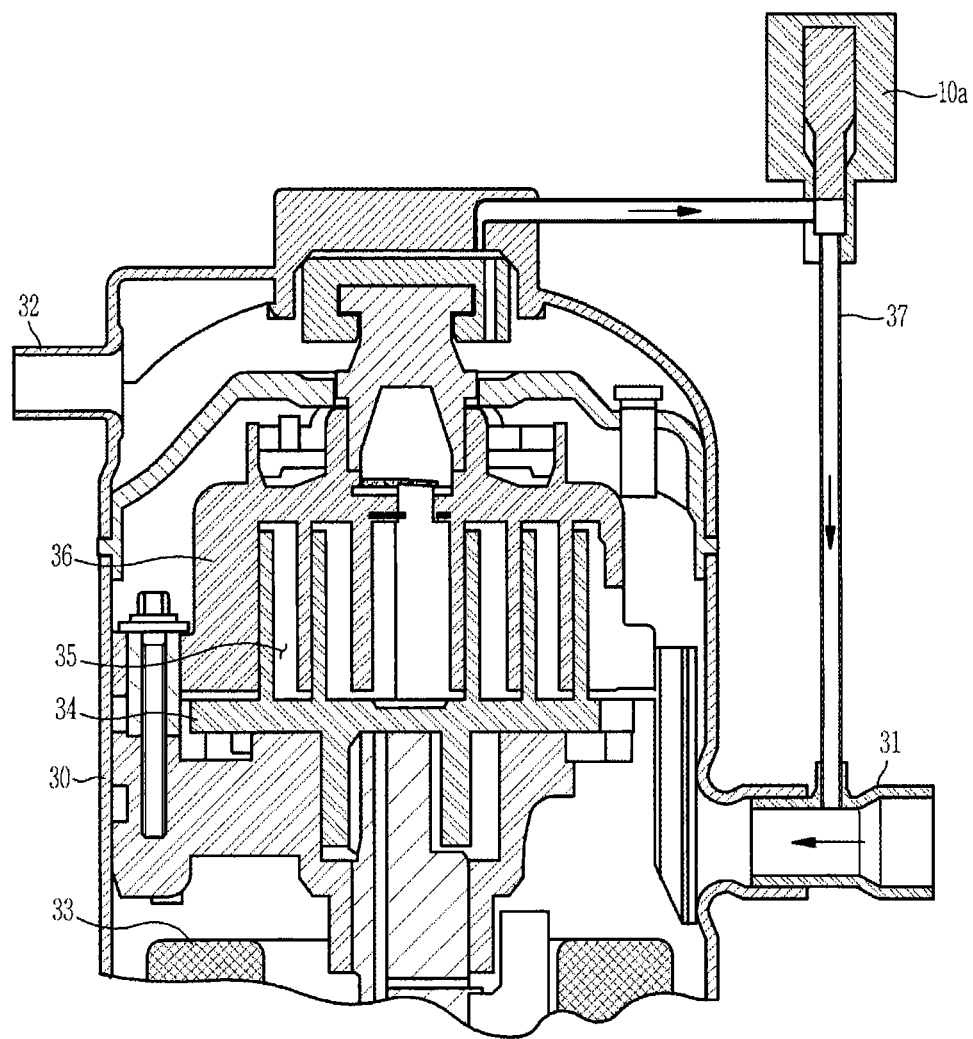
FIG. 3 is a cross-sectional view illustrating an unloading state of a compressor at the air conditioner in accordance with one embodiment of the present disclosure.

FIG. 2 is a cross-sectional view showing a loading state of the compressor at the air conditioner in accordance with one embodiment of the present disclosure, and FIG. 3 is a cross-sectional view showing an unloading state of the compressor at the air conditioner in accordance with one embodiment of the present disclosure.

As illustrated on FIG. 2 and FIG. 3, the first compressor 10 includes a casing 30 provided with an inlet port 31 and an outlet port 32, a motor 33 installed at an inside of the casing 30, an orbiting scroll 34 to rotate by receiving a rotation force of the motor 33, and a fixing scroll 36 to form a compression room 35 in between the fixing scroll 36 and the orbiting scroll 34.

The casing 30 is provided with a bypass pipe 37 connecting an upper side of the fixing scroll 36 to the inlet port 31, and a Pulse Width Modulated (PWM) valve 10a having a form of a solenoid valve is installed at the bypass pipe 37.

FIG. 2 illustrates a case in which the PWM valve 10a blocks the bypass pipe 37 while in an OFF state, and in the state as such, the first compressor 10 discharges compressed refrigerant. The state as such is referred to as a loading state, and at this time, the first compressor 10 is driven at about 100% of capacity. The compressing of the refrigerant by the first compressor 10 while in an OFF state of the PWM valve 10a is referred to as a loading operation of the first compressor 10.

FIG. 3 illustrates a case in which the PWM valve 10a opens the bypass pipe 37 while in a state of ON, and in the state as such, the refrigerant is not being discharged from the first compressor 10. The state as such is referred to as an unloading state, and the first compressor 10 is driven at about 0% of capacity. The stopping of the compression of the refrigerant by the first compressor 10 while in an ON state of the PWM valve 10a is referred to as an unloading operation of the first compressor 10.

Regarding whether the first compressor 10 proceeds with a loading driving or an unloading driving, the first compressor 10 is supplied with power, and the motor 33 is rotated at a constant speed. When the supply of power is blocked at the first compressor 10, the motor 33 is not being rotated, and the driving of the first compressor 10 is stopped.

Thus, the first compressor 10 has the operating capacity varied by the PWM valve 10a controlled according to the duty control signal that determines the loading time in which the refrigerant is being discharged and the unloading time in which the discharging of the refrigerant is being stopped. At this time, the first compressor 10, assuming that one period is about 20 seconds, performs a compression task to compress refrigerant for about 13 seconds, and does not perform a compression task for about 7 seconds. While the first compressor 10 is performing a compression task, power is consumed and refrigerant is compressed, but while the first compressor 10 is not performing a compression task, power consumption is largely decreased and refrigerant is not compressed. Through the method as such, by adjusting the loading time during which the variable-capacity compressor 10 performs a compression task and the unloading time during which the variable-capacity compressor 10 does not perform a compression task, the operating capacity of the variable-capacity compressor 10 is made variable.

Meanwhile, the second compressor 11 may be provided with the same structure as that of the first compressor 10.

Referring to FIG. 1 again, the 4-way valve 12 switches the flow of the refrigerant being discharged from the compressors 10 and 11 into a cooling mode or a heating mode.

The outdoor heat exchanger 13 is configured to exchange heat with outdoor air, as refrigerant passes through the outdoor heat exchanger 13. The outdoor heat exchanger 13 functions as a condenser during a cooling operation, so that the refrigerant is condensed by radiating heat, and during a heating operation, the outdoor heat exchanger 13 functions as an evaporator, so that the refrigerator is evaporated by absorbing heat.

The outdoor fan 14 blows outdoor air to the outdoor heat exchanger 13 for the exchange of heat between outdoor air and refrigerant.

The electric expansion valve 15 decompresses the refrigerant that is being admitted to the indoor heat exchanger 16.

The indoor heat exchanger 16 is configured to exchange heat with indoor air, as refrigerant passes through the indoor heat exchanger 16. The indoor heat exchanger 16 functions as an evaporator during a cooling operation, so that the refrigerator is evaporated by absorbing heat, and during a heating operation, the indoor heat exchanger 16 functions as a condenser, so that the refrigerator is condensed by radiating heat.

The indoor fan 17 blows indoor air to the indoor heat exchanger 16 for the exchange of heat between indoor air and refrigerant.

The accumulator 18 separates gas state refrigerant and liquid state refrigerant from the refrigerant that is introduced toward an inlet side of the compressors 10 and 11.

A low pressure detection unit 19 detects the pressure of the refrigerant being introduced to the compressors 10 and 11. That is, a low pressure sensor 19 is installed on a low pressure pipe adjacent to an inlet side of the compressors 10 and 11, so as to detect the pressure of the refrigerant that flows at an inside the low pressure pipe, and provides the information with reference to the detected pressure to a control unit that performs an overall control.

A high pressure detection unit 20 detects the pressure of the refrigerant being discharged from the compressors 10 and 11. That is, the high pressure detection unit 20 is installed on a high pressure pipe adjacent to an outlet side of the compressors 10 and 11, so as to detect the pressure of the refrigerant that flows at an inside the high pressure pipe, and provides the information with reference to the detected pressure to the control unit.

With respect to the air conditioner in accordance with one embodiment of the present disclosure, the control unit, by controlling the 4-way valve 12 to change the flow of the refrigerant, performs a heating operation or a cooling drive.

In a case of a cooling operation, the refrigerant flows toward a direction of an arrow of a solid line. That is, the high-temperature, high-pressure refrigerant being discharged from the compressors 10 and 11 is condensed while passing through the outdoor heat exchanger 13. The refrigerant that is passed through the outdoor heat exchanger 13 is decompressed at the electric expansion valve 15, and then taking heat away from indoor air while being evaporated at the indoor heat exchanger 16, thereby performing a cooling. The refrigerant that is passed through the indoor heat exchanger 16 passes through the 4-way valve 12 and the accumulator 18, and is introduced to and then compressed again at the compressors 10 and 11.

Meanwhile, in a case of a heating operation, the refrigerant flows toward a direction of an arrow of a dotted line. That is, the high-temperature, high-pressure refrigerant being discharged from the compressors 10 and 11, while being condensed at the indoor heat exchanger 16, radiates heat to the indoor air to perform a heating. The refrigerant that is passed through the indoor heat exchanger 16 is decompressed at the electric expansion valve 15, and is evaporated by taking the heat away from outdoor air while passing through the outdoor heat exchanger 13. The refrigerant that is passed through the outdoor heat exchanger 13 passes through the 4-way valve 12 and the accumulator 18, and is introduced to and then compressed again at the compressors 10 and 11.

As described above, in a case when the two compressors are needed to be operated, for a purpose of decreasing a starting load, the two compressors are sequentially started by operating the first compressor first, and then operating the second compressor in a state of the operating capacity of the first compressor is decreased. As a result of the above, a section in which the operating capacity of the first compressor is being decreased is present, and thus the cooling and heating ability of an overall system shows a pattern that decreases and then increases again. Eventually, from the perspective of a user, the cooling and heating speed is decreased. To prevent the decrease of the cooling and heating speed as such, in a case of simultaneously starting the two units of the compressors, the starting load is increased, and thus the possibility of the starting the compressors failing is increased.

Thus, in one embodiment of the present disclosure, in a case when the operation of the plurality of compressors is needed, a plurality of compressors is simultaneously operated if the starting load of the air conditioner is smaller than a reference load corresponding to a predetermined range, and the plurality of compressors is sequentially operated if the starting load is larger than the reference load. In a starting load state in which the starting stability and the cooling and heating performance are not being decreased, the plurality of compressors are simultaneously operated at the same point of time, and in a starting load state in which the starting stability and the cooling and heating performance are being decreased, the plurality of compressors are sequentially started.

Figure 4:
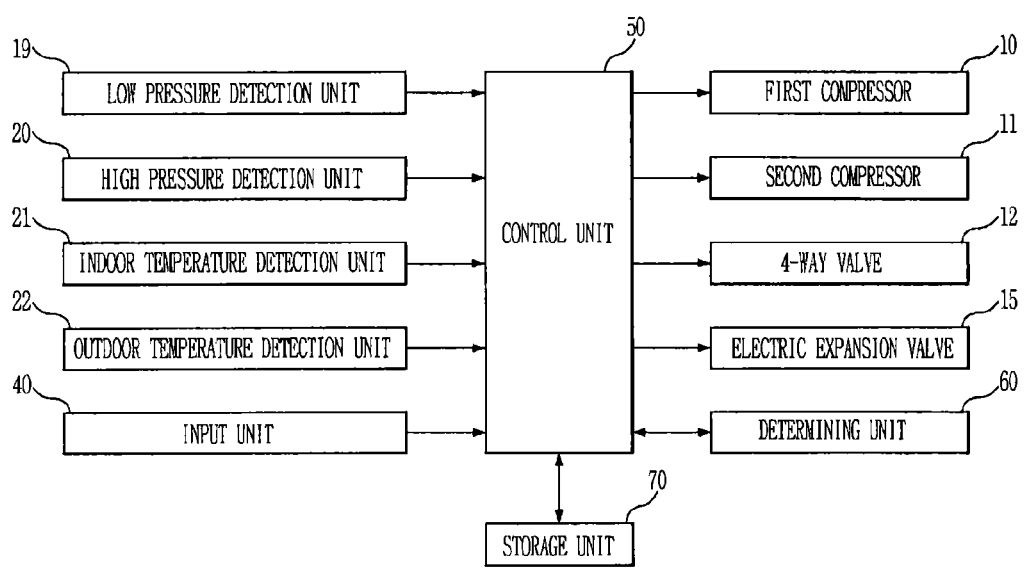
FIG. 4 is a control block diagram illustrating the air conditioner schematically shown in accordance with one embodiment of the present disclosure.

FIG. 4 is a control block diagram of the air conditioner schematically shown in accordance with one embodiment of the present disclosure.

As illustrated on FIG. 4, the air conditioner in accordance with one embodiment of the present disclosure includes the control unit 60 to perform an overall control.

The low pressure detection unit 19, the high pressure detection unit 20, an indoor temperature detection unit 21, an outdoor temperature detection unit 22, and an input unit 40 are electrically connected to the control unit 60.

The low pressure detection unit 19 detects the pressure of the refrigerant that is introduced into the compressors 10 and 11.

The high pressure detection unit 20 detects the pressure of the refrigerant that is discharged from the compressors 10 and 11.

The indoor temperature detection unit 21 detects an indoor temperature.

The outdoor temperature detection unit 22 detects an outdoor temperature.

The input unit 40 receives various information including an operation mode and a setting temperature from a user.

In addition, the first compressor 10, the second compressor 11, the 4-way valve 12, the electric expansion valve 15, a determining unit 60, and a storage unit 70 are electrically connected to the control unit 50.

The storage unit 70 stores various information related to the driving of the air conditioner.

The determining unit 60 determines whether the starting load of the air conditioner is within a predetermined range. The determining unit 60, in a case when the indoor temperature and the outdoor temperature are within respective reference temperature ranges for each of a cooling operation and a heating operation, determines that the starting load of the air conditioner is smaller than the reference load, and in a case when the indoor temperature and the outdoor temperature diverge from the respective reference temperature ranges for each of the cooling operation and the heating operation, determines that the starting load of the air conditioner is larger than the reference load.

Meanwhile, the determining unit 60, in a case when the pressure at a low pressure side and the pressure at a high pressure side are within the respective reference pressure ranges, determines that the starting load of the air conditioner is smaller than the reference load, and in a case when the pressure at a low pressure side and the pressure at a high pressure side diverge from the respective reference pressure ranges, determines that the starting load of the air conditioner is larger than the reference load.

In addition, the determining unit 60, by placing more consideration on the operation history after the input of system power as well as on the operation stop duration after the driving of the system, rather than on the indoor temperature and the outdoor temperature and the pressure at a low pressure side and the pressure at a high pressure side for each of a cooling operation and a heating operation, determines whether the starting load of the air conditioner is smaller than or larger than the reference load.

The control unit 50, if determined that the starting load of the air conditioner is smaller than the reference load, simultaneously starts the two compressors 10 and 11 at the same point of time. Through the above, the starting stability of the compressors 10 and 11 may be secured while simultaneously starting the compressors 10 and 11. Since the compressors 10 and 11 may be simultaneously started, the section in which the operating capacity of the compressors 10 and 11 is decreased in preparation of the sequential starting of the compressors 10 and 11 may be eliminated, and thus the decrease of the cooling and heating performance of the air conditioner may be prevented.

Meanwhile, the control unit 50, if determined that the starting load of the air conditioner is larger than the reference load, sequentially starts the two compressors 10 and 11, the same as in a conventional method. At this time, in a state of a certain one of the compressors, for example, the first compressor 10, is started first, and then the next compressor 11 is started in a state the operating capacity of the first-started first compressor 10 is lowered below a reference capacity.

Figure 5:
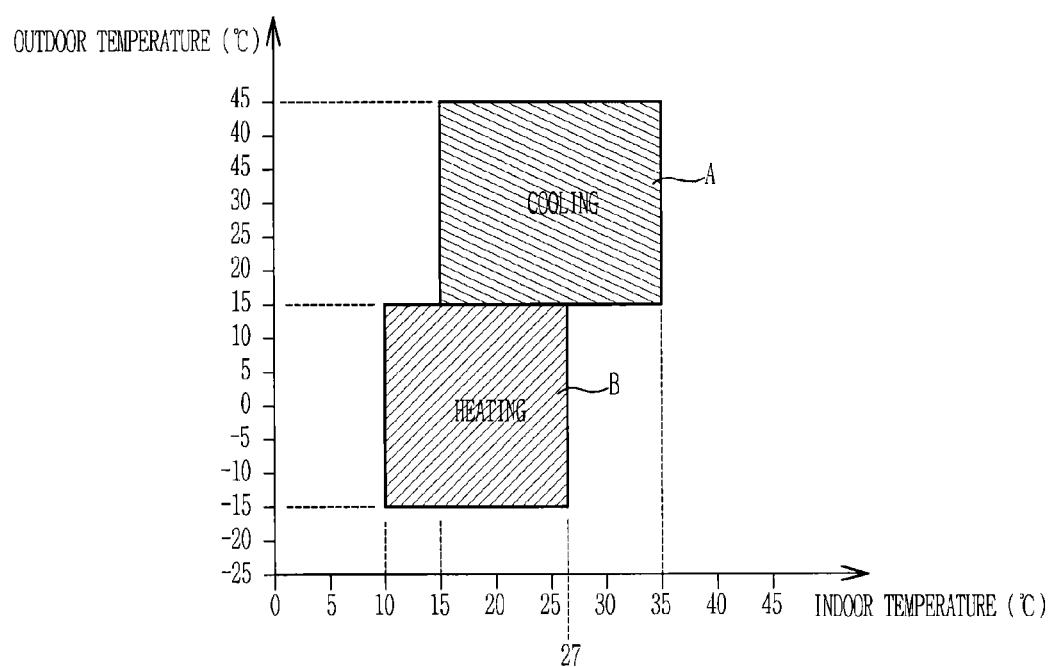
FIG. 5 is a drawing illustrating a starting load of the air conditioner according to the outdoor temperature and the indoor temperature for each of a cooling operation and a heating operation at the air conditioner in accordance with one embodiment of the present disclosure.
Figure 6:
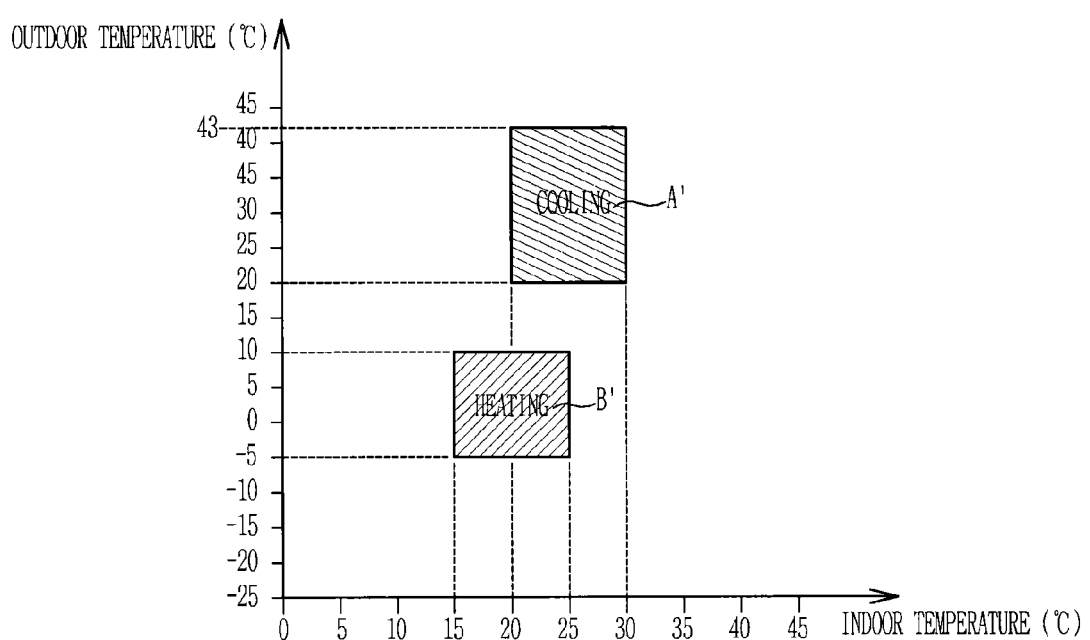
FIG. 6 is a drawing illustrating a temperature range at which the starting load of the air conditioner, which is based on an outdoor temperature and an indoor temperature for each of a cooling operation and a heating operation at the air conditioner, is minimized in accordance with one embodiment of the present disclosure.

FIG. 5 is a drawing to describe a starting load of the air conditioner according to the outdoor temperature and the indoor temperature for each of a cooling operation and a heating operation at the air conditioner in accordance with one embodiment of the present disclosure, and FIG. 6 is a drawing to describe a temperature range at which the starting load of the air conditioner, which is based on an outdoor temperature and an indoor temperature for each of a cooling operation and a heating operation of the air conditioner, is minimized in accordance with one embodiment of the present disclosure.

As illustrated on FIG. 5, the temperature range of the cooling operation corresponds to a cooling operation-temperature range A provided with the indoor temperature between 15° C. and 35° C., and provided with the outdoor temperature between 15° C. and 35° C.

The temperature range of the heating operation corresponds to a heating operation-temperature range B provided with the indoor temperature between 10° C. and 27° C., and provided with the outdoor temperature between −15° C. and 15° C.

In a case when the air conditioner is started for a cooling operation, if the indoor temperature and the outdoor temperature are included in the cooling-operation temperature range A, the starting load of the air conditioner is determined to be smaller than the reference load, and if the indoor temperature and the outdoor temperature are not included in the cooling-operation temperature range A, the starting load of the air conditioner is determined to be larger than the reference load. At this time, the reference load is referred to as the amount of the load capable of securing the starting reliability of the each compressor, even in a case when the two compressors are simultaneously started at the same point of time.

Thus, when the starting load of the air conditioner is smaller than the reference load, even if the two compressors are simultaneously started, the starting reliability of the each compressor may be secured. However, when the starting load of the air conditioner is larger than the reference load, the two compressors are not simultaneously started, and even in a case when the two compressors are simultaneously started for a moment, a normal cooling operation is in fact difficult.

Meanwhile, in a case when the air conditioner is started for a heating operation, when the indoor temperature and the outdoor temperature are included in the heating-operation temperature range B, the starting load of the air conditioner is determined to be smaller than the reference load, and when the indoor temperature and the outdoor temperature are not included in the heating-operation temperature range B, the starting load of the air conditioner is determined to be larger than the reference load.

As illustrated on FIG. 6, particularly in a case when the temperature range of the cooling operation is within a cooling-operation temperature range A' provided with the indoor temperature between 20° C. and 30° C., and provided with the outdoor temperature between 20° C. and 43° C., or in a case when the temperature range of the heating operation is within a heating-operation temperature range B' provided with the indoor temperature between 15° C. and 25° C., and provided with the outdoor temperature between −5° C. and 10° C., the starting load of the air conditioner becomes minimized, and thus the simultaneous driving of the first compressor 10 and the second compressor 11 may be possible in a further stable manner.

Figure 7:
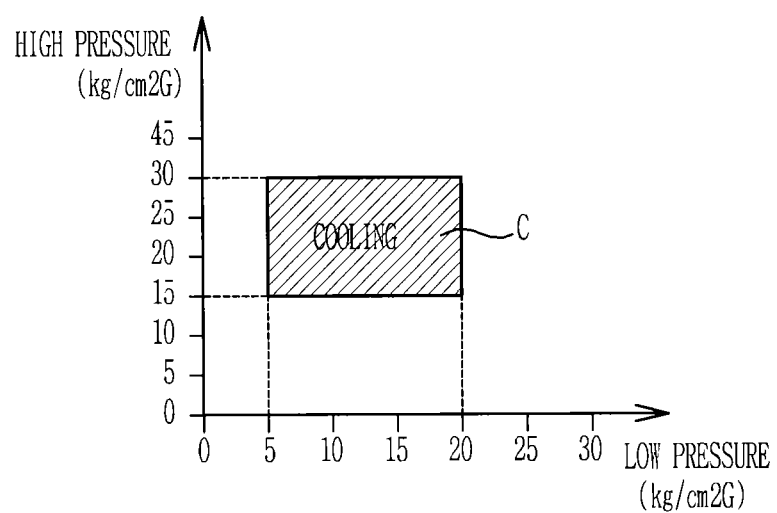
FIG. 7 is a drawing illustrating a starting load of the air conditioner based on the pressure on a high pressure side and the pressure on a low pressure side in a case of a cooling operation at the air conditioner in accordance with one embodiment of the present disclosure.
Figure 8:
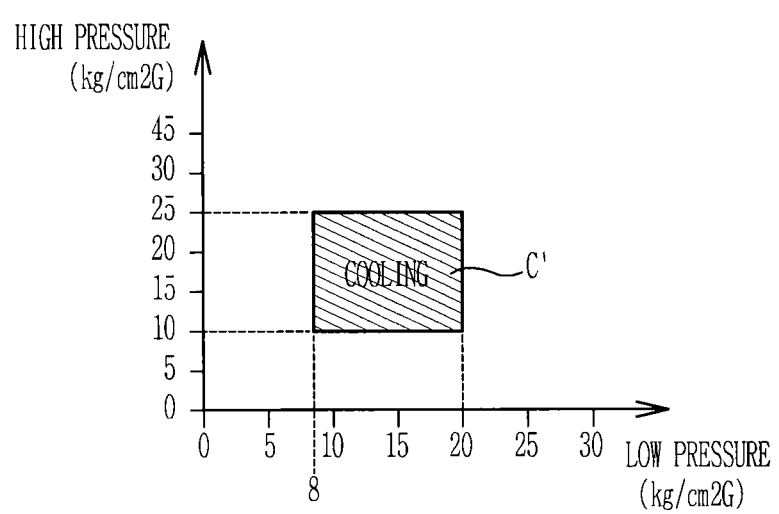
FIG. 8 is a drawing illustrating a pressure range at which a starting load of the air conditioner, which is based on the pressure on a high pressure side and the pressure on a low pressure side in a case of a cooling operation at the air conditioner, is minimized in accordance with one embodiment of the present disclosure.

FIG. 7 is a drawing to describe a starting load of the air conditioner based on the pressure on a high pressure side and the pressure on a low pressure side in a case of a cooling operation at the air conditioner in accordance with one embodiment of the present disclosure, and FIG. 8 is a drawing to describe a pressure range at which a starting load of the air conditioner, which is based on the pressure on a high pressure side and the pressure on a low pressure side in a case of a cooling operation at the air conditioner, is minimized in accordance with one embodiment of the present disclosure.

As illustrated on FIG. 7, the pressure range of the cooling operation corresponds to a cooling-operation pressure range C provided with the pressure at a low pressure side between 5 kg/cm2G and 20 kg/cm2G, and provided with the pressure at a high pressure side between 15 kg/cm2G and 30 kg/cm2G. At this time, the difference between the high pressure and the low pressure may be about 5 kg/cm2G or below.

In a case when the air conditioner is started for a cooling operation, if the pressure at the low pressure side and the pressure at the high pressure side are included in the cooling-operation pressure range C, the starting load of the air conditioner is determined to be smaller than the reference load, and if the pressure at the low pressure side and the pressure at the high pressure side are not included in the cooling-operation pressure range C, the starting load of the air conditioner is determined to be larger than the reference load. At this time, the reference load is referred to as the amount of the load capable of securing the starting reliability of the each compressor, even in a case when the two compressors are simultaneously started at the same point in time.

As illustrated on FIG. 8, particularly in a case of the pressure range of the cooling operation is within a cooling-operation pressure range C' provided with the pressure at the low pressure side between 8 kg/cm2G and 20 kg/cm2G, and provided with the pressure at the high pressure side between 10 kg/cm2G and 25 kg/cm2G, at this time, the difference between the high pressure and the low pressure may be about 5 kg/cm2G or below, the starting load of the air conditioner becomes minimized, and thus the simultaneous driving of the first compressor 10 and the second compressor 11 may be possible in a further stable manner.

Figure 9:
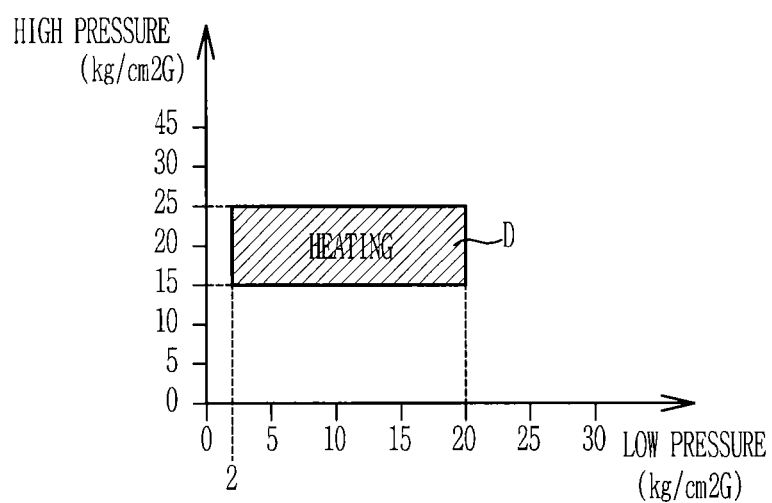
FIG. 9 is a drawing illustrating a starting load of the air conditioner based on the pressure on a high pressure side and the pressure on a low pressure side in a case of a heating operation at the air conditioner in accordance with one embodiment of the present disclosure.
Figure 10:
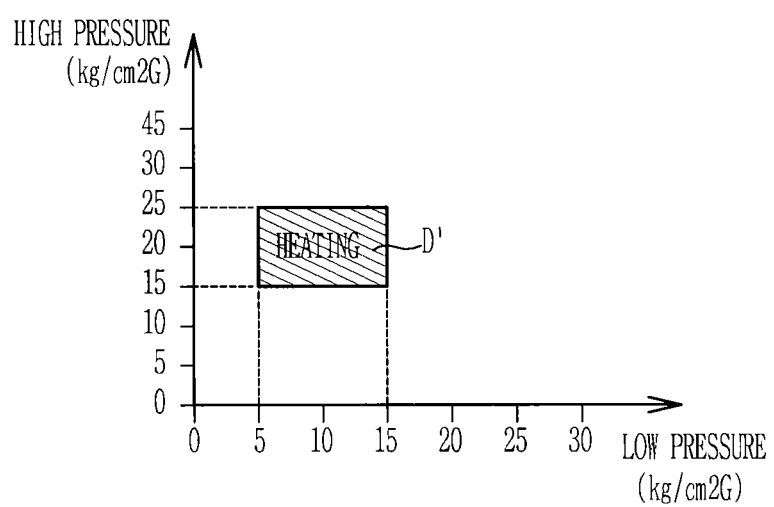
FIG. 10 is a drawing illustrating a pressure range at which a starting load of the air conditioner, which is based on the pressure on a high pressure side and the pressure on a low pressure side in a case of a heating operation at the air conditioner, is minimized in accordance with one embodiment of the present disclosure.

FIG. 9 is a drawing to describe a starting load of the air conditioner based on the pressure on a high pressure side and the pressure on a low pressure side in a case of a heating operation at the air conditioner in accordance with one embodiment of the present disclosure. FIG. 10 is a drawing to describe a pressure range at which a starting load of the air conditioner, which is based on the pressure on a high pressure side and the pressure on a low pressure side in a case of a heating operation at the air conditioner, is minimized in accordance with one embodiment of the present disclosure.

As illustrated on FIG. 9, the pressure range of the heating operation corresponds to a heating-operation pressure range D provided with the pressure at the low pressure side between 2 kg/cm2G and 20 kg/cm2G, and provided with the pressure at the high pressure side between 15 kg/cm2G and 25 kg/cm2G. At this time, the difference between the high pressure and the low pressure may be about 5 kg/cm2G or below.

In a case when the air conditioner is started for a heating operation, if the pressure at the low pressure side and the pressure at the high pressure side are included in the heating-operation pressure range D, the starting load of the air conditioner is determined to be smaller than the reference load, and when the pressure at the low pressure side and the pressure at the high pressure side are not included in the heating-operation pressure range D, the starting load of the air conditioner is determined to be larger than the reference load. At this time, the reference load is referred to as the amount of the load capable of securing the starting reliability of the each compressor, even in a case when the two compressors are simultaneously started at the same point in time.

As illustrated on FIG. 10, particularly in a case of the pressure range of the heating operation is within a heating-operation pressure range D' provided with the pressure at the low pressure side between 5 kg/cm2G and 15 kg/cm2G, and provided with the pressure at the high pressure side between 15 kg/cm2G and 25 kg/cm2G, at this time, the difference between the high pressure and the low pressure may be about 5 kg/cm2 G below, the starting load of the air conditioner becomes minimized, and thus the simultaneous driving of the first compressor 10 and the second compressor 11 may be possible in a further stable manner.

Figure 11:
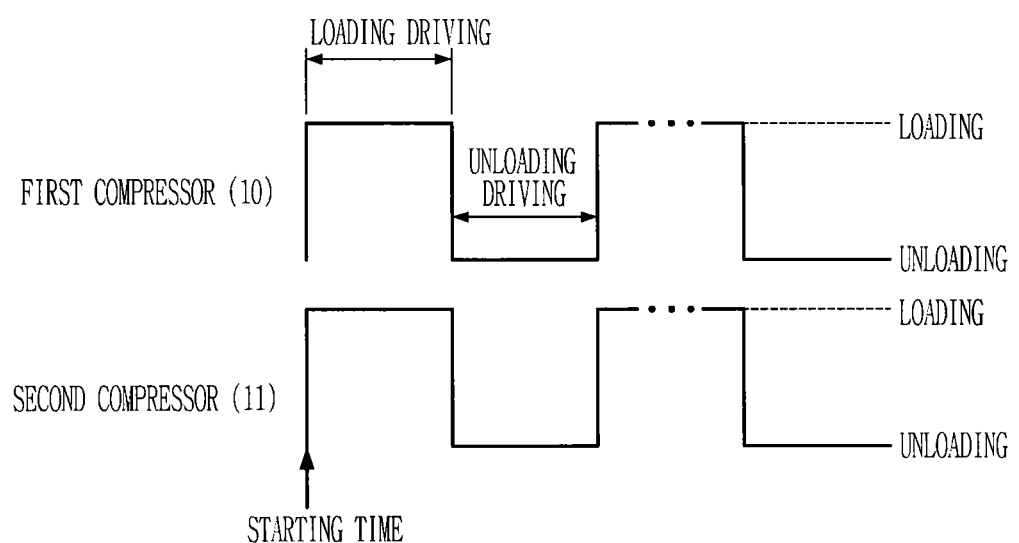
FIG. 11 is a timing chart illustrating the simultaneous starting of a first compressor and a second compressor at the same point of time in a case of a cooling and a heating operation at the air conditioner in accordance with one embodiment of the present disclosure.

FIG. 11 is a timing chart to describe the starting of a first compressor and a second compressor in a simultaneous manner at the same point in time in a case of a cooling operation and a heating operation at the air conditioner in accordance with one embodiment of the present disclosure.

As illustrated on FIG. 11, when the starting load of the air conditioner is smaller than the reference load, the first compressor 10 and the second compressor 12 are simultaneously started at the same point of time.

Figure 12:
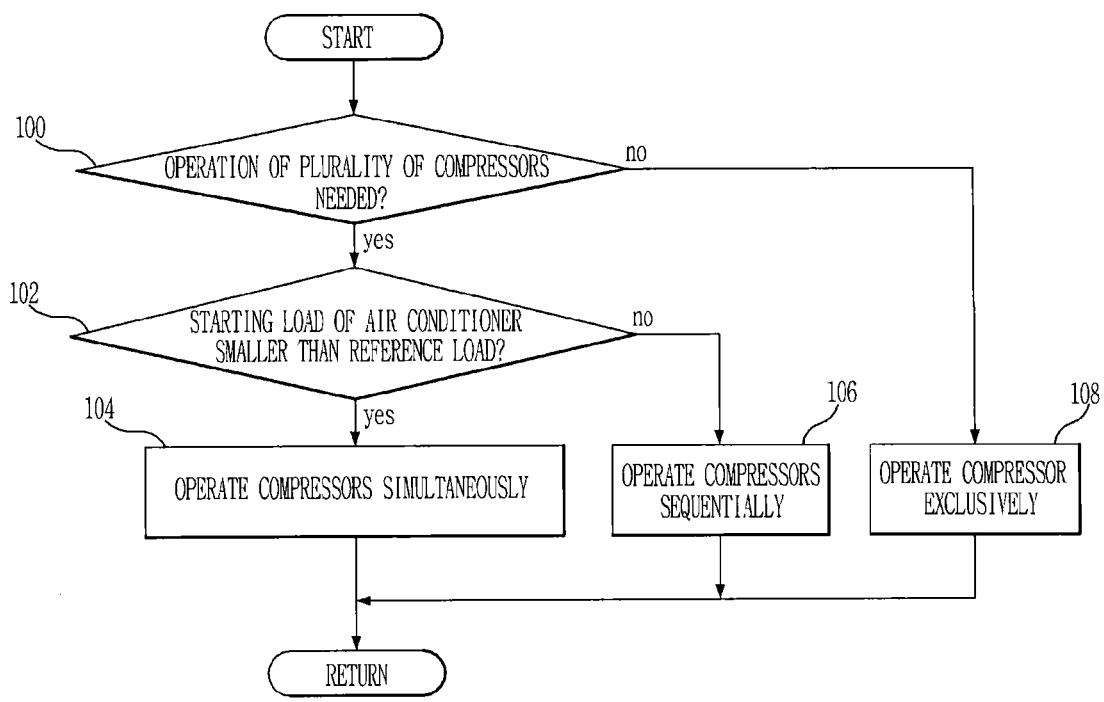
FIG. 12 is a control flow chart illustrating a starting control method of an air conditioner in accordance with one embodiment of the present disclosure.

FIG. 12 is a control flow chart illustrating a starting control method of the air conditioner in accordance with one embodiment of the present disclosure.

Referring to FIG. 12, first, the control unit 50 determines whether the operation of the plurality of compressors is needed in a case of a cooling/heating operation (100). At this time, the control unit 50 calculates the operating capacity that is needed according to the load of the air conditioner, and according to the calculation of the operating capacity, the control unit 50 determines whether the plurality of compressors is to be started, or a certain one of the plurality of compressors is to be started.

If determined as a result of the operation mode 100 that the operation of the plurality of compressors is needed, the control unit 50 determines whether the starting load of the air conditioner is smaller than a reference load (102). If determined as a result of the operation mode 102 that the starting load of the air conditioner is smaller than the reference load, the control unit 50 simultaneously starts the plurality of compressors (104).

Meanwhile, if determined as a result of the operation mode 102 that the starting load of the air conditioner is larger than the reference load, the control unit 50 sequentially starts the plurality of compressors (106). At this time, in a state of a certain one of the compressors is started first, and then, the next compressor is started in a state that the operating capacity of the first-started first compressor is lowered below a reference capacity.

Meanwhile, if determined as a result of the operation mode 100 that the driving of the plurality of compressors is not needed, a certain one of the plurality of compressors is exclusively started (108).

Figure 13:
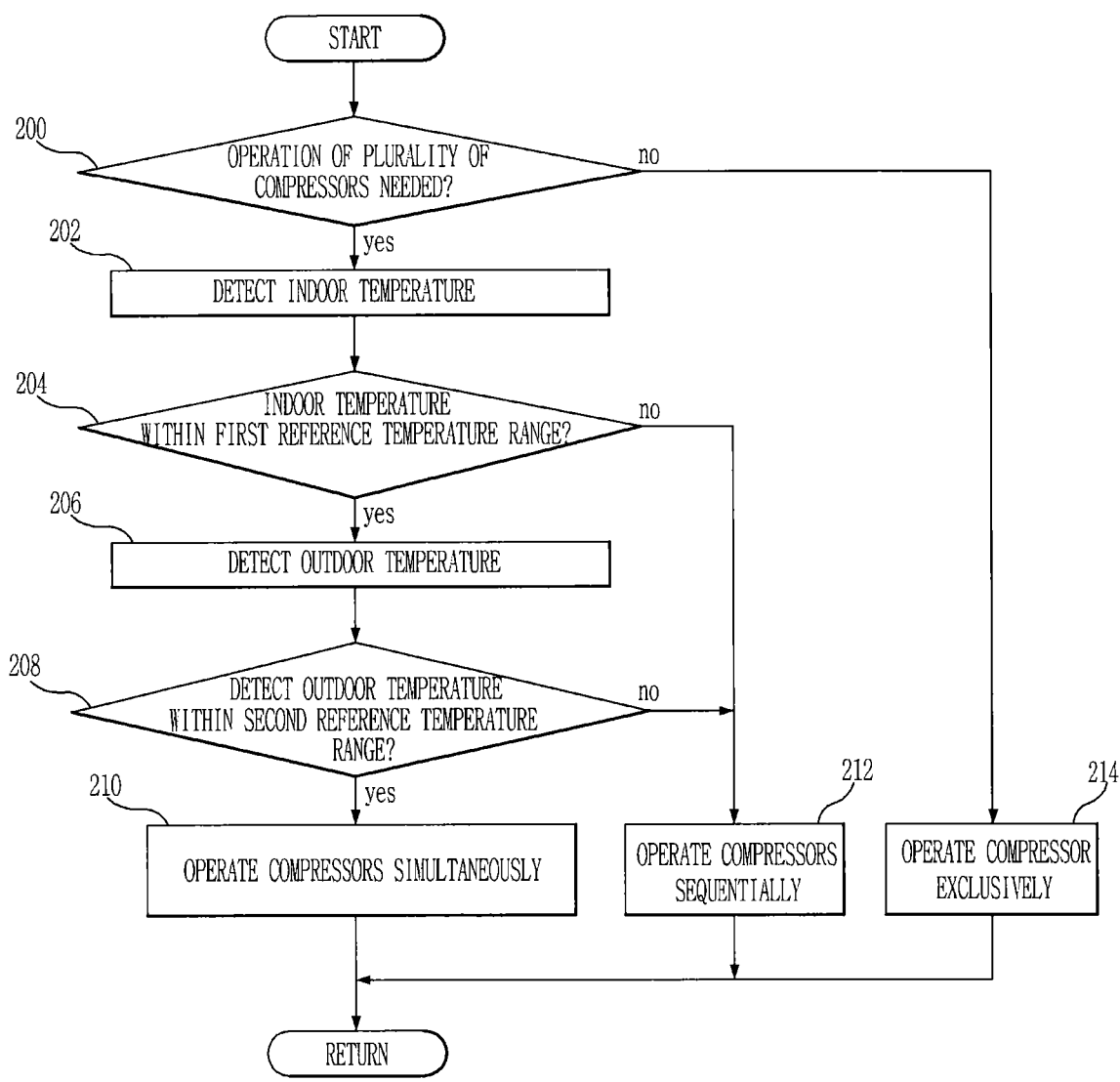
FIG. 13 is a control flow chart illustrating a method of controlling the starting of a plurality of compressors by using the starting load of the air conditioner based on the outdoor temperature and the indoor temperature at the air conditioner in accordance with one embodiment of the present disclosure.

FIG. 13 is a control flow chart illustrating a method of controlling the starting of the plurality of compressors by using the starting load of the air conditioner based on the outdoor temperature and the indoor temperature at the air conditioner in accordance with one embodiment of the present disclosure.

Referring to FIG. 13, first, the control unit 50 determines whether the operation of the plurality of compressors is needed (200). If determined as a result of the operation mode 200 that the operation of the plurality of compressors is needed, the control unit 50 detects an indoor temperature through the indoor temperature detection unit 21 (202).

Then, the control unit 50 determines whether the detected indoor temperature is within a first reference temperature range (204). The first reference temperature range, while having a cooling operation as a reference, may be between 15° C. and 35° C., and while having a heating operation as a reference, may be between 10° C. and 27° C. Particularly, the first reference temperature range, while having a cooling operation as a reference, may be between 20° C. and 30° C., and while having a heating operation as a reference, may be between 15° C. and 25° C.

If determined that the indoor temperature detected as a result of the operation mode 204 is within the first reference temperature range, the control unit 50 detects an outdoor temperature through the outdoor temperature detection unit 22 (206).

Then, the control unit 50 determines whether the detected outdoor temperature is within a second reference temperature range (208). The second reference temperature range, while having a cooling operation as a reference, may be between 15° C. and 45° C., and while having a heating operation as a reference, may be between −15° C. and 15° C. Particularly, the second reference temperature range, while having a cooling operation as a reference, may be between 20° C. and 43° C., and while having a heating operation as a reference, may be between −5° C. and 10° C.

If determined as a result of the operation mode 208 that the outdoor temperature detected is within the second reference temperature range, the control unit 50 determines that the starting load of the air conditioner is smaller than the reference load, and simultaneously starts the plurality of compressors (210).

Meanwhile, if determined as a result of the operation mode 204 that the indoor temperature is diverged from the first reference temperature range, or if determined as a result of the operation mode 208 that the outdoor temperature is diverged from the second reference temperature range, the control unit 50 determines that the starting load of the air conditioner is larger than the reference load, and sequentially starts the plurality of compressors (212). At this time, in a state of a certain one of the compressors is started first, and the next compressor is started in a state that the operating capacity of the first-started first compressor is lowered below the reference capacity.

Meanwhile, if determined as a result of the operation mode 200 that the driving of the plurality of compressors is not needed, a certain one of the plurality of compressors is exclusively started (214).

Figure 14:
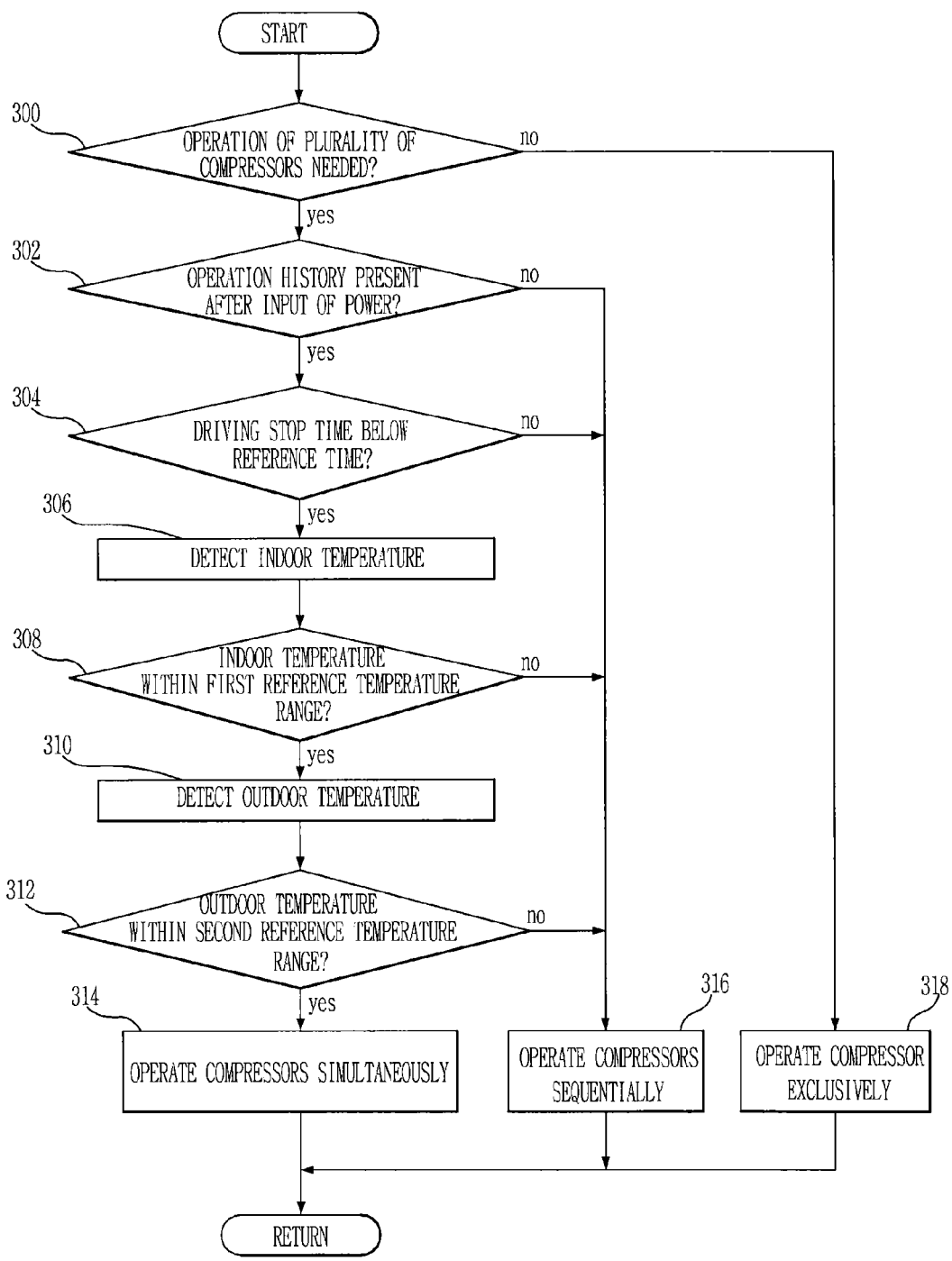
FIG. 14 is a control flow chart illustrating a method of controlling the starting of a plurality of compressors by further considering the operation history and the operation stop duration at FIG. 13.

FIG. 14 is a control flow chart illustrating a method of controlling the starting of the plurality of compressors by further considering the operation history and the operation stop duration at FIG. 13.

Referring to FIG. 14, first, the control unit 50 determines whether the operation of the plurality of compressors is needed (300).

If determined as a result of the operation mode 300 that the operation of the plurality of compressors is needed, the control unit 50 determines whether an operation history is present after the input of power is made (302). The above is provided to avoid an issue of reliability that may be generated in a case that an initial starting of the compressors is performed at the time of an initial installation of the system or when the input of power is not made for a long period of time.

If determined as a result of the operation mode 302 that the operation history is present after the input of power is made, the control unit 50 determines whether the operation stop duration is below a reference time after the operation of the system (304). The above is provided to avoid an issue related to the increase of an initial starting load or the starting reliability that may be generated in a case when the driving is stopped for a long period of time after the operation of the system. At this time, the reference time for the operation stop duration may be 12 hours or below.

If determined as a result of the operation 304 that the operation stop duration is below the reference time, the control unit 50 detects the indoor temperature through the indoor temperature detection unit 21 (306).

Then, the control unit 50 determines whether the detected indoor temperature is within the first reference temperature range (308).

If determined as a result of the operation mode 308 that the detected indoor temperature is within the first reference temperature range, the control unit 50 detects the outdoor temperature through the outdoor temperature detection unit 22 (310).

Then, the control unit 50 determines whether the detected outdoor temperature is within the second reference temperature range (312).

If determined as a result of the operation mode 312 that the outdoor temperature detected is within the second reference temperature range, the control unit 50 determines that the starting load of the air conditioner is smaller than the reference load, and simultaneously starts the plurality of compressors (314).

Meanwhile, if determined as a result of the operation mode 302 that the operation history is not present after the input of power, if determined as a result of the operation mode 304 that the operation stop duration is above the reference time, if determined as a result of the operation mode 308 that the indoor temperature is diverged from the first reference temperature range, or if determined as a result of the operation mode 312 that the outdoor temperature is diverged from the second reference temperature range, the control unit 50 determines that the starting load of the air conditioner is larger than the reference load, and sequentially starts the plurality of compressors (316).

Meanwhile, if determined as a result of the operation mode 300 that the driving of the plurality of compressors is not needed, a certain one of the plurality of compressors is exclusively started (318).

Figure 15:
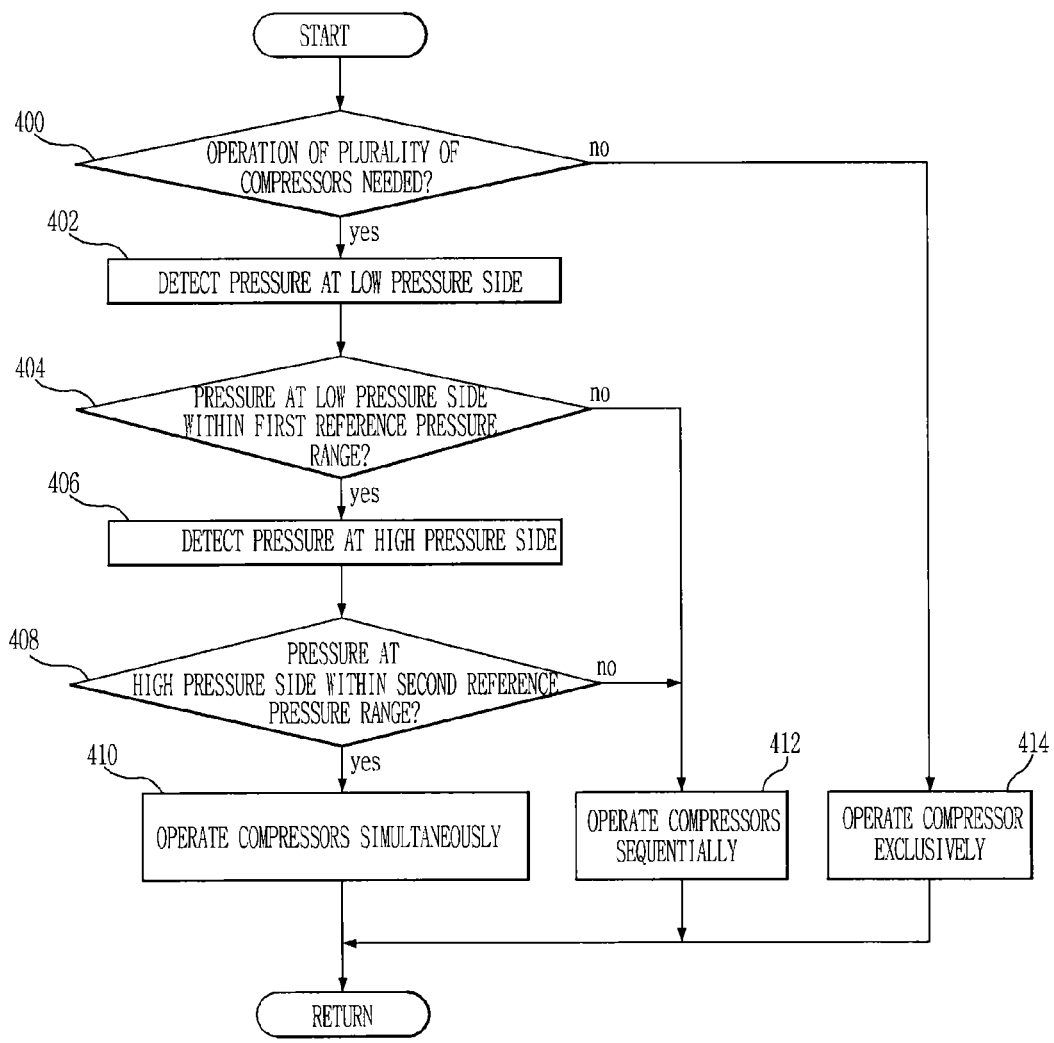
FIG. 15 is a control flow chart illustrating a method of controlling the starting of the plurality of compressors by using the starting load of the air conditioner based on the pressure on a high pressure side and the pressure on a low pressure side at the air conditioner in accordance with one embodiment of the present disclosure.

FIG. 15 is a control flow chart illustrating a method of controlling the starting of the plurality of compressors by using the starting load of the air conditioner based on the pressure on a high pressure side and the pressure on a low pressure side at the air conditioner in accordance with one embodiment of the present disclosure.

Referring to FIG. 15, first, the control unit 50 determines whether the operation of the plurality of compressors is needed (400). If determined as a result of the operation 400 that the operation of the plurality of compressors is needed, the control unit 50 detects the pressure at a low pressure side through the low pressure detection unit 19 (402).

Then, the control unit 50 determines whether the detected pressure at the low pressure side is within the first reference pressure range (404). The first reference pressure range, while having a cooling operation as a reference, may be between 5 kg/cm2G and 20 kg/cm2G, and while having a heating operation as a reference, may be between 2 kg/cm2G and 20 kg/cm2G. Particularly, the first reference pressure range, while having a cooling operation as a reference, may be between 8 kg/cm2G and 20 kg/cm2G, and while having a heating operation as a reference, may be between 5 kg/cm2G and 15 kg/cm2G.

If determined as a result of the operation mode 404 that the detected pressure at the low pressure side is within the first reference pressure range, the control unit 50 detects the pressure at the high pressure side through the high pressure detection unit 20 (406).

Then, the control unit 50 determines whether the detected pressure at the high pressure side is within the second reference pressure range (408). The second reference pressure range, while having a cooling operation as a reference, may be between 10 kg/cm2G and 25 kg/cm2G, and while having a heating operation as a reference, may be between 10 kg/cm2G and 25 kg/cm2G. Particularly, the second reference pressure range, while having a cooling operation as a reference, may be between 15 kg/cm2G and 30 kg/cm2G, and while having a heating operation as a reference, may be between 15 kg/cm2G and 25 kg/cm2G.

If determined as a result of the operation 408 that the detected pressure at the high pressure side is within the second reference pressure range, the control unit 50 determines that the starting load of the air conditioner is smaller than the reference load, and simultaneously starts the plurality of compressors (410).

Meanwhile, if determined as a result of the operation mode 404 that the pressure at the low pressure side is diverged from the first reference pressure range, or if determined as a result of the operation 408 that the pressure at the high pressure side is diverged from the second reference pressure range, the control unit 50 determines that the starting load of the air conditioner is larger than the reference load, and sequentially starts the plurality of compressors (412). At this time, a certain one of the compressors is started first, and the next compressor is started in a state that the operating capacity of the first-started first compressor is lowered below a reference capacity.

Meanwhile, if determined as a result of the operation mode 400 that the driving of the plurality of compressors is not needed, a certain one of the plurality of compressors is exclusively started (414).

Figure 16:
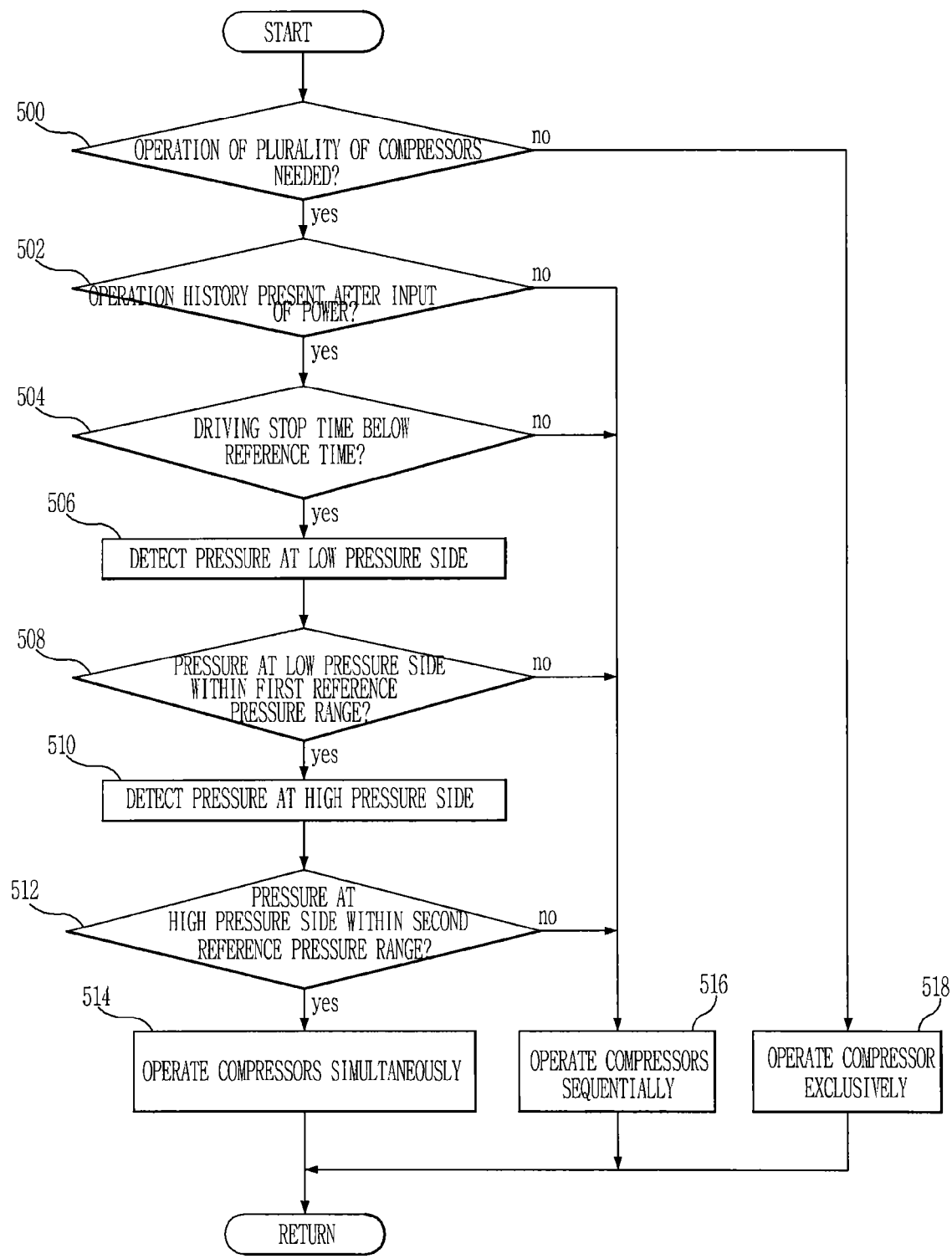
FIG. 16 is a control flow chart illustrating a method of controlling the starting of the plurality of compressors by further considering the operation history and the operation stop duration at FIG. 15.

FIG. 16 is a controlled flow chart illustrating a method of controlling the starting of the plurality of compressors by further considering the operation history and the operation stop duration at FIG. 15.

Referring to FIG. 16, first, the control unit 50 determines whether the operation of the plurality of compressors is needed (500).

If determined as a result of the operation 500 that the operation of the plurality of compressors is needed, the control unit 50 determines whether an operation history is present after the input of power is made (502). The above is provided to avoid an issue of reliability that may be generated in a case that an initial starting of the compressors is performed when an initial installation of the system is made or when the input of power is not made for a long period of time.

If determined as a result of the operation mode 502 that the operation history is present after the input of power is made, it is determined whether the operation stop duration after the operation of the system is below a reference time (504). The above is provided to avoid an issue related to the increase of an initial starting load or the starting reliability that may be generated in a case when the driving is stopped for a long period of time after the operation of the system. At this time, the reference time for the operation stop duration may be 12 hours or below.

If determined as a result of operation 504 that the operation stop duration is below the reference time, the control unit 50 detects the pressure at the low pressure side through the low pressure detection unit 19 (506).

Then, the control unit 50 determines whether the detected pressure at the low pressure side is within the first reference temperature range (508).

If determined as a result of the operation mode 508 that the detected indoor temperature is within the first reference temperature range, the control unit 50 detects the pressure at the high pressure side through the high pressure detection unit 20 (510).

Then, the control unit 50 determines whether the detected pressure at the high pressure side is within the second reference temperature range (512).

If determined as a result of the operation mode 512 that the detected pressure at the high pressure side is within the second reference temperature range, the control unit 50 determines that the starting load of the air conditioner is smaller than the reference load, and simultaneously starts the plurality of compressors (514).

Meanwhile, if determined as a result of the operation mode 502 that the operation history is not present after the input of power, if determined as a result of the operation mode 504 that the operation stop duration is above the reference time, if determined as a result of the operation mode 508 that the pressure at the low pressure side is diverged from the first reference pressure range, or if determined as a result of the operation mode 512 that the pressure at the high pressure side is diverged from the second reference pressure range, the control unit 50 determines that the starting load of the air conditioner is larger than the reference load, and sequentially starts the plurality of compressors (516). At this time, a certain one of the compressors is started first, and the next compressor is started in a state that the operating capacity of the first-started first compressor is lowered with respect to the reference capacity.

Meanwhile, if determined as a result of the operation mode 500 that the driving of the plurality of compressors is not needed, a certain one of the plurality of compressors is exclusively started (518).

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An air conditioner, comprising:
a plurality of compressors;
an indoor temperature detection unit configured to detect an indoor temperature of the air conditioner and an outdoor temperature detection unit configured to detect an outdoor temperature of the air conditioner;
a determining unit configured to determine whether a starting load of the air conditioner is smaller than a reference load, the determining unit being configured to determine that the starting load of the air conditioner is smaller than the reference load if the indoor temperature detected through the indoor temperature detection unit is within a first reference temperature range and if the outdoor temperature detected through the outdoor temperature detection unit is within a second reference temperature range, and the determining unit being configured to determine that the starting load of the air conditioner is smaller than the reference load if an operation history is present after an input of power and an operation stop duration is below a reference time and to determine that the starting load of the air conditioner is larger than the reference load if the operation history is not present after the input of power or the operation stop duration is above the reference time; and
a control unit, in a case when operating the plurality of compressors is needed, configured to simultaneously start the plurality of compressors if the starting load of the air conditioner is smaller than the reference load as a result of the determination of the determining unit, and configured to sequentially start the plurality of compressors if the starting load of the air conditioner is larger than the reference load.

2. The air conditioner of claim 1, wherein:
the first reference temperature range is between 15° C. and 35° C. in a case of a cooling operation, and is between 10° C. and 27° C. in a case of a heating operation, and,
the second reference temperature range is between 15° C. and 45° C. in a case of a cooling operation, and is between −15° C. and 15° C. in a case of a heating operation.

3. The air conditioner of claim 2, wherein:
the first reference temperature range is between 20° C. and 30° C. in a case of a cooling operation, and is between 15° C. and 25° C. in a case of a heating operation, and,
the second reference temperature range is between 20° C. and 43° C. in a case of a cooling operation, and is between −5° C. and 10° C. in a case of a heating operation.

4. The air conditioner of claim 1, wherein:
the determining unit is configured to determine that the starting load of the air conditioner is larger than the reference load if the indoor temperature detected through the indoor temperature detection unit is diverged from the first reference temperature range and if the outdoor temperature detected through the outdoor temperature detection unit is diverged from the second reference temperature range.

* * * * *